United States Patent [19]

Schiffler

[11] Patent Number: 5,791,444

[45] Date of Patent: Aug. 11, 1998

[54] HYDRAULIC ROTARY ACTUATOR SUCH AS A ROTARY ACTUATOR FOR A MOTOR VEHICLE SUSPENSION, AND A METHOD FOR ASSEMBLING THE ROTARY ACTUATOR

[75] Inventor: Stefan Schiffler, Schonungen, Germany

[73] Assignee: Fichtel & Sachs AG, Schweinfurt, Germany

[21] Appl. No.: 331,048

[22] Filed: Oct. 28, 1994

[30] Foreign Application Priority Data

Nov. 5, 1993 [DE] Germany ............. 43 37 818.8
Sep. 29, 1994 [DE] Germany ............. 44 34 761.8

[51] Int. Cl.[6] .................. F01C 9/00; F01C 19/00; F15B 15/12
[52] U.S. Cl. ............ 188/293; 280/689; 188/296
[58] Field of Search ............... 188/293, 294, 188/296, 307; 280/689, 723; 92/125; 277/165, 81 R

[56] References Cited

FOREIGN PATENT DOCUMENTS

| 0460366 | 12/1991 | European Pat. Off. . |
| 7501199 | 10/1989 | Germany . |
| 4018215 | 12/1991 | Germany . |
| 3186424 | 8/1991 | Japan ..................... 280/689 |
| 0983706 | 2/1965 | United Kingdom . |
| 1096266 | 12/1967 | United Kingdom . |

*Primary Examiner*—Matthew C. Graham
*Attorney, Agent, or Firm*—Nils H. Ljungman and Associates

[57] ABSTRACT

A hydraulic rotary actuator has a housing with at least one rib on its inside wall and a motor shaft with at least one vane on its outside shell surface, whereby the housing with its ribs and the motor shaft with its vanes form a working chamber which is closed off on the ends by means of a cap. A gasket is located between the motor shaft and a component of the housing to seal the working chamber off from the environment. The gasket and housing component can preferably form a latching mechanism therebetween to retain the gasket in position during assembly of the rotary actuator.

12 Claims, 9 Drawing Sheets

HYDRAULIC ROTARY ACTUATOR SUCH AS A ROTARY ACTUATOR FOR A MOTOR VEHICLE SUSPENSION, AND A METHOD FOR ASSEMBLING THE ROTARY ACTUATOR

CROSS REFERENCE TO RELATED APPLICATIONS

This application is related to several co-pending applications which are directed to rotary actuators and have either applicants in common with the present application or have the same assignee as the present application. The related co-pending applications are as follows: Ser. No. 08/330908, filed Oct. 28, 1994 entitled "Rotary actuator with stabilizer in a motor vehicle suspension system" now U.S. Pat. No. 5,580,079; Ser. No. 08/330934, filed Oct. 28, 1994 entitled "Stabilizer system for a motor vehicle suspension system with a rotary actuator" now U.S. Pat. No. 5,573,265; Ser. No. 08/331042, filed Oct. 28, 1994 entitled "Rotary actuator such as a hydraulic rotary actuator for a motor vehicle and a method of making a rotary actuator" now U.S. Pat. No. 5,575,502; Ser. No. 08/331045, filed Oct. 28, 1994 entitled "A rotary actuator such as a rotary actuator for a motor vehicle suspension" now U.S. Pat. No. 5,632,502; Ser. No. 08/331115, filed Oct. 28, 1994 entitled "A rotary actuator, a rotary actuator in a motor vehicle suspension, and a method of mass producing rotary actuators" now U.S. Pat. No. 5,601,165; Ser. No. 08/331890, filed Oct. 31, 1994 entitled "Anti-roll vehicular suspension system and a hydraulic rotary actuator system in an anti-roll vehicular suspension system" now U.S. Pat. No. 5,527,061; Ser. No. 08/360434, filed Oct. 28, 1994 entitled "Anti-roll vehicular suspension system and a hydraulic rotary actuator system in an anti-roll vehicular suspension system".

BACKGROUND OF THE INVENTION

1. Field of the Invention

The present invention generally relates to a rotary actuator, such as a hydraulic rotary actuator for a motor vehicle suspension. In addition, the present invention also relates to a method for assembling a rotary actuator. Such a hydraulic rotary actuator can essentially have a housing that defines an inner chamber, with at least one rib on an inside wall of the housing. Further, such a rotary actuator can also essentially have a motor shaft, disposed within the inner chamber of the housing, and which shaft can have at least one vane on an outside shell surface thereof. The housing with its ribs, and the motor shaft with its vanes, can together form a working chamber therebetween. This working chamber can be closed off on the ends thereof by means of a cap. A gasket, prestressed by means of a spring, can typically be located between the motor shaft and a component of the housing, such as the end cap, to seal the working chamber, or chambers, off from the environment.

2. Background Information

Publication 75 011 99.05.10.89 by LEIBFRIED Maschinenbau GmbH, Herrenberg, Federal Republic of Germany, discloses a rotary actuator which seals its work chambers from the environment by means of gaskets. These gaskets are located between the motor shaft and the housing, e.g. in the caps. During the assembly of the rotary actuator, one of the gaskets in the cap to be installed could possibly be displaced, so that a change in position occurs, or the gasket might fall out completely. In the first case, wherein the gasket might be simply displaced within the cap, a pinching of the gasket could occur during assembly, with the consequence that the seal of the rotary actuator will not be tight, thereby enabling leakage to occur. In the second case, wherein the gasket might completely fall out of the cap, the installer must laboriously replace the gasket and then further attempt to attach the cap with the gasket to the rotary actuator. These problems typically occur, in particular, during large scale series production (mass production) using industrial robots. In such large scale production, it is generally not possible to inspect every rotary actuator to determine whether the gasket is properly seated or whether a gasket is present at all. Thus, rotary actuators could be produced which have substantial leakage of fluids when a pressure is applied thereto.

A further rotary actuator is disclosed by the British Patent GB 983 706. In essence, this actuator also has gaskets disposed between the motor shaft and the housing, for example, in the end caps. The seal rings are prestressed, or biased, by a spring in an axial direction. As such, the seal ring lying immediately adjacent the motor shaft can maintain its sealing effectiveness after a certain amount of wear has occurred. The problems of the seal ring falling out, or becoming displaced is however, still possible with the presence of the spring.

Another type of shaft seal is provided by the Federal Republic of Germany Laid-Open Patent Application DE-OS 40 18 215 A1. For this seal, there is an additional elastically deformable shoulder, or projection on the outer diameter of the shaft seal ring. This shoulder, during assembly, which snaps into, or catches a corresponding groove in the seat of the receiving bore, provides a securing of the shaft seal ring against axial displacement.

The disadvantage of these shaft seal rings lies in the fact that the shaft seal ring, during operation, is no longer axially displaceable. Consequently, such an embodiment of a seal can not be used in rotary actuator because no "wear compensation" is possible.

OBJECT OF THE INVENTION

The object of the present invention is therefore to create a rotary actuator in which the known problems, as discussed above, can be reliably overcome using the simplest possible means, or in other words, to provide a greater likelihood that a correct sealing will result during the assembly of the rotary actuators, while also providing a seal which can be maintained even after wear of the seal.

SUMMARY OF THE INVENTION

To achieve this object, the present invention teaches that, between the sealing gasket and at least one portion of the housing, there can preferably be some sort of catch means which can be configured to retain the gasket in place on the housing part during the assembly stages. In this regard, it can be preferable that the gasket includes some sort of latching, or locating mechanism that can form a latch with the housing portion of the rotary actuator, whereby the latch can be formed by at least one elastic snap hook. This elastic snap hook can be supported, during assembly, in the direction opposite the mounting direction, against a retaining surface of a seal groove of the housing part. As such, the gasket can preferably be configured with at least one projection, on an inserted end thereof, which projection can preferably engage with a groove, or recess of the housing part to which the gasket is being assembled. In the assembled position, the elastic snap hook preferably leaves a clearance to the retaining surface which catches the snap hook. This clearance can preferably be broader than the wear travel of the seal ring.

After latching, the rotary actuator, or a component of the actuator which holds the gasket, can then preferably be moved freely with a substantially minimized risk of the gasket being displaced or even falling out. Thus, during assembly of the rotary actuator, which assembly can preferably be performed by industrial robots, there can be a substantially minimized risk that a rotary actuator will be assembled with a missing or displaced gasket.

By means of the snap hook, a strict functional separation is created between the sealing part and the retaining part of the seal, so that the previously described sealing tolerances remain unchanged. By means of the clearance breadth between the retaining surfaces, the seal wear calculation is sustained. In other words, on account of the clearance, the gasket can move axially during use to provide an effective seal even after some wear of the gasket has occurred. This axial displacement distance can preferably be greater than the expected amount of wear of the gasket so that the gasket is able to move axially within the housing part to compensate for wear and thereby maintain an effective seal.

As provided by one advantageous embodiment of the present invention, one of the two gasket parts can preferably have at least one notch therein. Such a notch can preferably be disposed in opposition to the elastic snap hook, to allow for deformation of the elastic snap hook and thus preferably act as a seat for the elastic snap hook during latching. Such a seat can essentially provide a controlled deformation of the gasket part having the elastic snap hook, and can thereby preferably prevent a pinching of the gasket. For the same purpose, pressure can also be applied to the gasket by a spring so that the gasket assumes a defined installation position once the gasket is installed.

In accordance with one preferred embodiment of the present invention, a mounting bevel can preferably be provided on one of the gasket and the housing part to which the gasket is being installed, to facilitate installation, or insertion of the gasket into the housing part. While such a mounting bevel can be provided on the housing part, such a bevel on the housing part has been found to be rather difficult to work with. In essence, for functional reasons, it has been found to be desirable that there preferably be no mounting bevel on the rotary actuator itself. In such a case, that is, when mounting bevels have been provided on the actuator itself, unacceptable leaks generally can occur between the working chambers. For this reason, it can therefore be advantageous that the latching mechanism of the gasket part include such a mounting bevel.

According to another advantageous characteristic of the present invention, the gasket can preferably have two individual gasket parts which are supported against one another. The two gasket parts can preferably have facing bevelled surfaces which, in the event of opposing forces acting upon the gasket parts, can preferably allow the gasket parts to move radially and axially, relative to one another. These relative motions can be used for a pressure-assisted pre-stressing of the gaskets inside the rotary actuator.

The above discussed features of the present invention will be discussed further below with reference to figures which depict the various embodiments of the present invention. In this regard, it should be understood that when the word "invention" is used in this application, the word "invention" includes "inventions", that is, the plural of "invention". By stating "invention", Applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, with respect to one another.

One aspect of the invention resides broadly in a rotary actuator comprising: a housing device; apparatus for connecting the housing device to a first portion of a motor vehicle suspensions a shaft device, the shaft device defining a longitudinal axis; at least a portion of the shaft device being rotatably disposed within the housing device; apparatus for connecting the shaft device to a second portion of a motor vehicle suspension; bearing apparatus for rotatably mounting the at least a portion of the shaft device within the housing device for rotation of at least one of the shaft device and the housing device about the longitudinal axis with respect to the other of the shaft device and the housing device; the shaft device comprising an outer surface disposed towards the housing device; the housing device comprising an inner surface disposed towards the outer surface of the shaft device, the inner surface of the housing device being spaced apart from the outer surface of the shaft device to define a chamber between the shaft device and the housing device, the chamber having a first axial end and a second axial end; at least one of: the outer surface of the shaft device, and the inner surface of the housing device, comprising at least one projection extending towards the other of: the outer surface of the shaft device, and the inner surface of the housing device; the at least one projection extending from the first axial end of the chamber to the second axial end of the chamber to axially divide the chamber into a first chamber portion and a second chamber portion; the at least one projection comprising: a first side disposed towards the first chamber portion; a second side disposed opposite to the first side and adjacent the second chamber portion; a surface disposed between the first side and the second side, the surface being disposed towards the other of: the outer surface of the shaft device, and the inner surface of the housing device; and at least one seal apparatus for sealing the surface of the at least one projection to the other of: the outer surface of the shaft device, and the inner surface of the housing device, to minimize fluid flow from the first chamber portion to the second chamber portion; apparatus for introducing fluid into at least one of: the first chamber portion, and the second chamber portion, to apply pressure to the at least one of; the first side of the projection, and the second side of the projection to relatively rotate the housing device and the shaft device; cap device for closing at least one of the first and second axial ends of the chamber; the cap device comprising gasket apparatus for sealing the cap device about the shaft device; and catch apparatus for retaining the gasket apparatus within the cap device during at least assembly of the cap device to the housing.

Another aspect of the invention resides broadly in a motor vehicle suspension comprising suspension springs, a rotary actuator for stabilizing uneven deflections of the suspension springs, the rotary actuator comprising: a housing device; first connecting rod apparatus for connecting the housing device to a first load bearing portion of the motor vehicle suspension at a first side of the motor vehicle; a shaft device, the shaft device defining a longitudinal axis; at least a portion of the shaft device being rotatable disposed within the housing device; second connecting rod apparatus for connecting the shaft device to a second load bearing portion of a motor vehicle suspension at a second side of the motor vehicle; bearing apparatus for rotatably mounting the at least a portion of the shaft device within the housing device for rotation of at least one of the shaft device and the housing device about the longitudinal axis with respect to the other of the shaft device and the housing device; the shaft device comprising an outer surface disposed towards the housing device; the housing device comprising an inner surface disposed towards the outer surface of the shaft device, the inner surface of the housing device being spaced apart from the outer surface of the shaft device to define a chamber between the shaft device and the housing device, the chamber having a first axial end and a second axial end; at least one of: the outer surface of the shaft device, and the inner surface of the housing device, comprising at least one projection extending towards the other of: the outer surface of the shaft device, and the inner surface of the housing device; the at least one projection extending from the first axial end of the chamber to the second axial end of the chamber to axially divide the chamber into a first chamber portion and a second chamber portion; the at least one projection comprising: a first side disposed towards the first chamber portion; a second side disposed opposite to the first side and adjacent the second chamber portion; a surface disposed between the first side and the second side, the surface being disposed towards the other of: the outer surface of the shaft device, and the inner surface of the housing device; and at least one seal apparatus for sealing the surface of the at least one projection to the other of: the outer surface of the shaft device, and the inner surface of the housing device, to minimize fluid flow from the first chamber portion to the second chamber portion; apparatus for introducing fluid into at least one of: the first chamber portion, and the second chamber portion, to apply pressure to the at least one of: the first side of the projection, and the second side of the projection to relatively rotate the housing device and the shaft device; cap device for closing at least one of the first and second axial ends of the chamber; the cap device comprising gasket apparatus for sealing the cap device about the shaft device; and catch apparatus for retaining the gasket apparatus within the cap device during at least assembly of the cap device to the housing.

A further aspect of the invention resides broadly in a method for robotically mass assemblying rotary actuators, the rotary actuators comprising: housing device; shaft device, the shaft device defining a longitudinal axis; at least a portion of the shaft device being rotatably disposed within the housing device; the shaft device comprising an outer surface disposed towards the housing device; the housing device comprising an inner surface disposed towards the outer surface of the shaft device, the inner surface of the housing device being spaced apart from the outer surface of the shaft device to define a chamber between the shaft device and the housing device, the chamber having a first axial end and a second axial end; at least one of: the outer surface of the shaft device, and the inner surface of the housing device, comprising at least one projection extending towards the other of: the outer surface of the shaft device, and the inner surface of the housing device; the at least one projection extending from the first axial end of the chamber to the second axial end of the chamber to axially divide the chamber into a first chamber portion and a second chamber portion; apparatus for introducing fluid into at least one of: the first chamber portion, and the second chamber portion, to apply pressure to the at least one projection relatively rotate the housing device and the shaft device; cap device for closing at least one of the first and second axial ends of the chamber; the cap device comprising gasket apparatus for sealing the cap device about the shaft device; and catch apparatus for retaining the gasket apparatus within the cap device during at least assembly of the cap device to the housing; the method comprising, for each rotary actuator, the steps of: providing the cap device; providing the catch apparatus for retaining the gasket apparatus within the cap device; assembling the gasket apparatus with the cap device using robot apparatus to form an assembled cap device; retaining the gasket apparatus in the cap device via the apparatus for retaining; providing the housing device; providing the shaft device; providing the at least one projection on the at least one of the housing device and the shaft device; assembling the shaft device with the housing by relatively inserting at least a portion of the shaft device in the housing device using robot apparatus, the assembling of the shaft device with the housing comprising: forming the chamber between the outer surface of the shaft device and the inner surface of the housing device; and dividing the chamber into the first chamber portion and the second chamber portion with the projection; obtaining the assembled cap device; assembling the assembled cap device to the housing device using robot apparatus; and retaining the gasket apparatus in position within the assembled cap device during the assembling of the assembled cap device with the housing device.

BRIEF DESCRIPTION OF THE DRAWINGS

The present invention is described in greater detail below with reference to the accompanying drawings, in which.

DESCRIPTION OF THE PREFERRED EMBODIMENTS

Figure 1A:
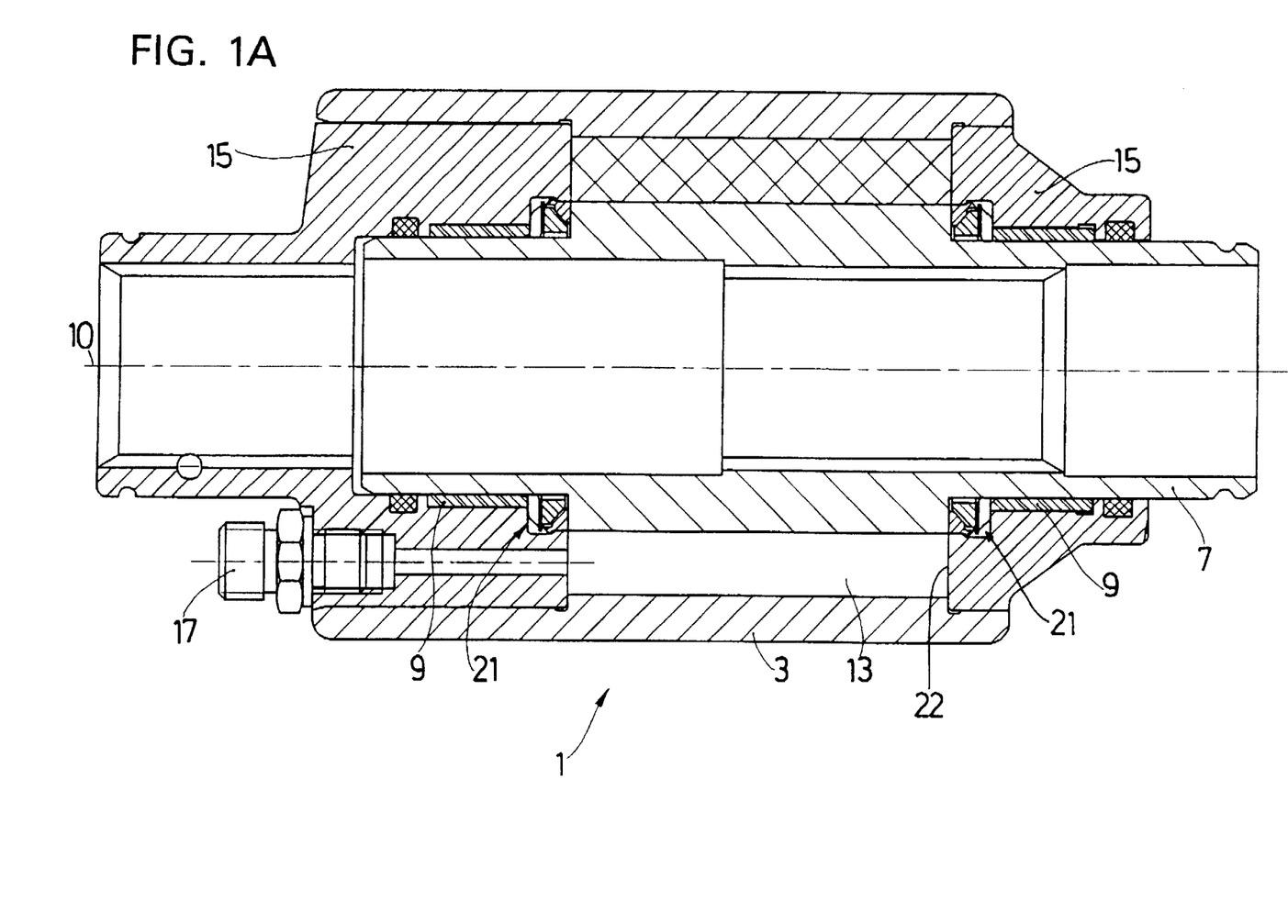
FIG. 1A shows a longitudinal section through a hydraulic rotary actuator.
Figure 1B:
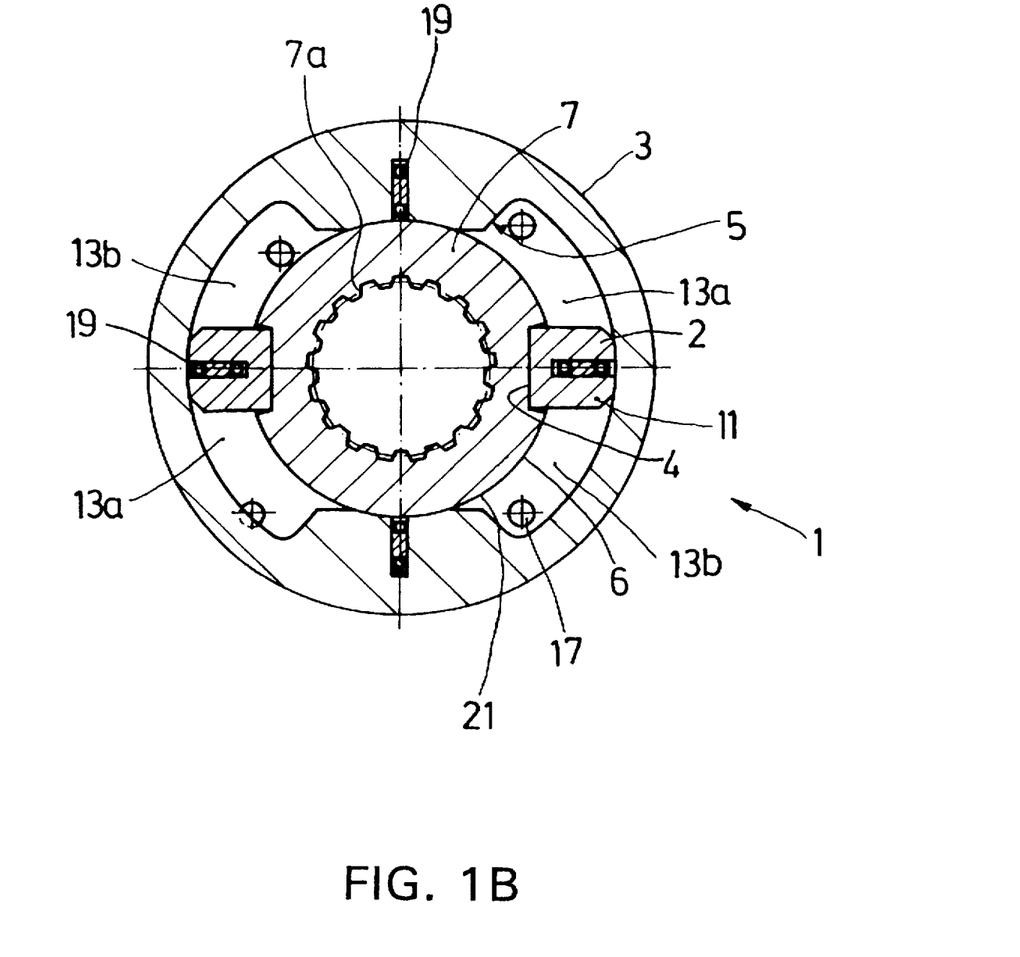
FIG. 1B shows a transverse sectional view of a hydraulic rotary actuator such as the actuator of FIG. 1A.

FIGS. 1A and 1B generally depict what could be considered to be the essential components of a hydraulic rotary actuator 1. As depicted, the hydraulic rotary actuator 1 can preferably have a housing 3, which housing 3 can preferably define an interior chamber having at least one rib 5 (FIG. 1B) on its inside walls. A motor shaft 7 can preferably be rotatably mounted within the housing 3 by means of bearings 9. The motor shaft 7 can essentially be configured with internal toothing 7a, as shown in FIG. 1B, to be connected to a portion of a motor vehicle suspension as will be discussed further herebelow.

Figure 1C:
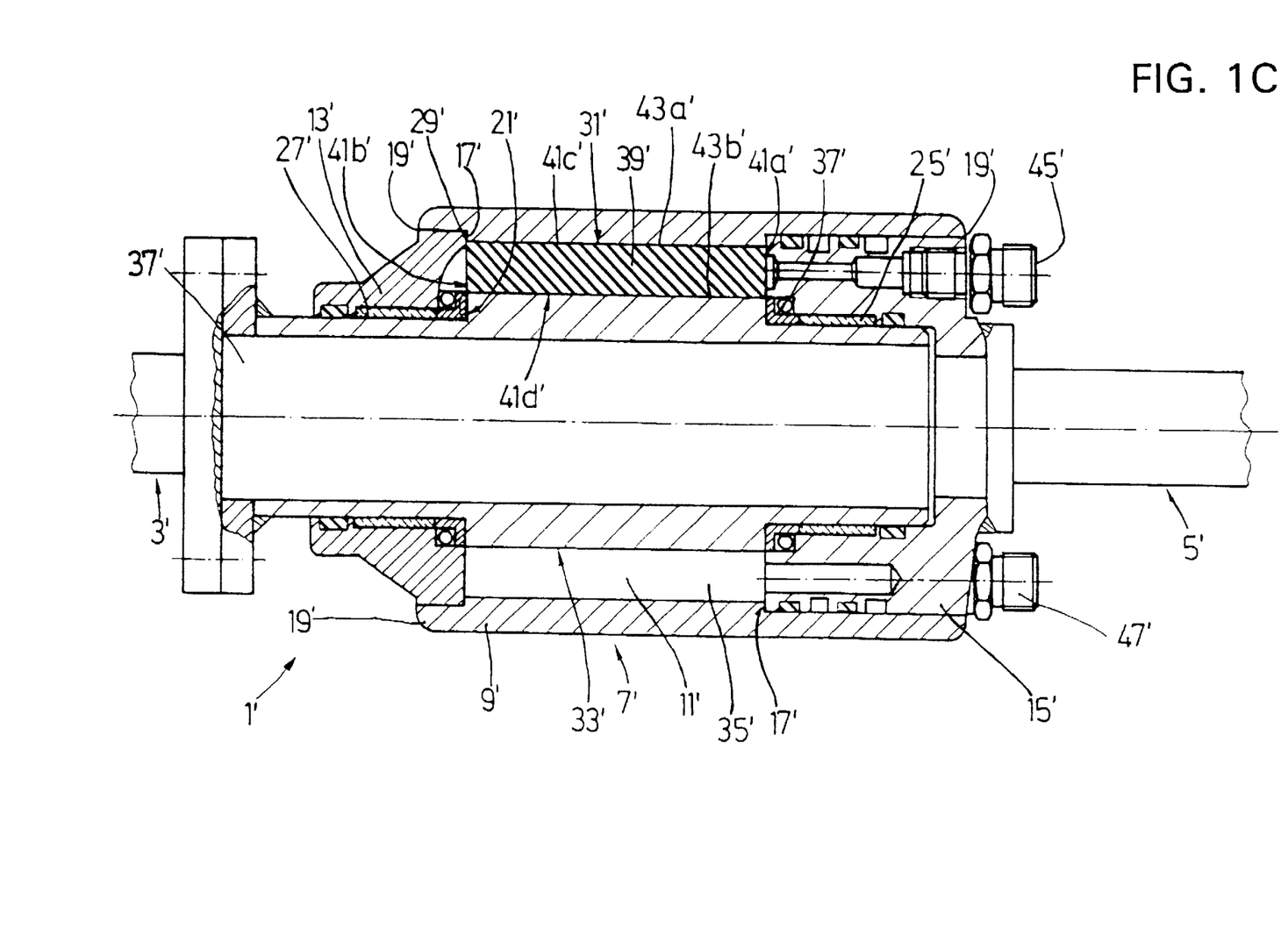
FIG. 1C shows a more detailed depiction of another embodiment of a hydraulic rotary actuator.
Figure 1D:
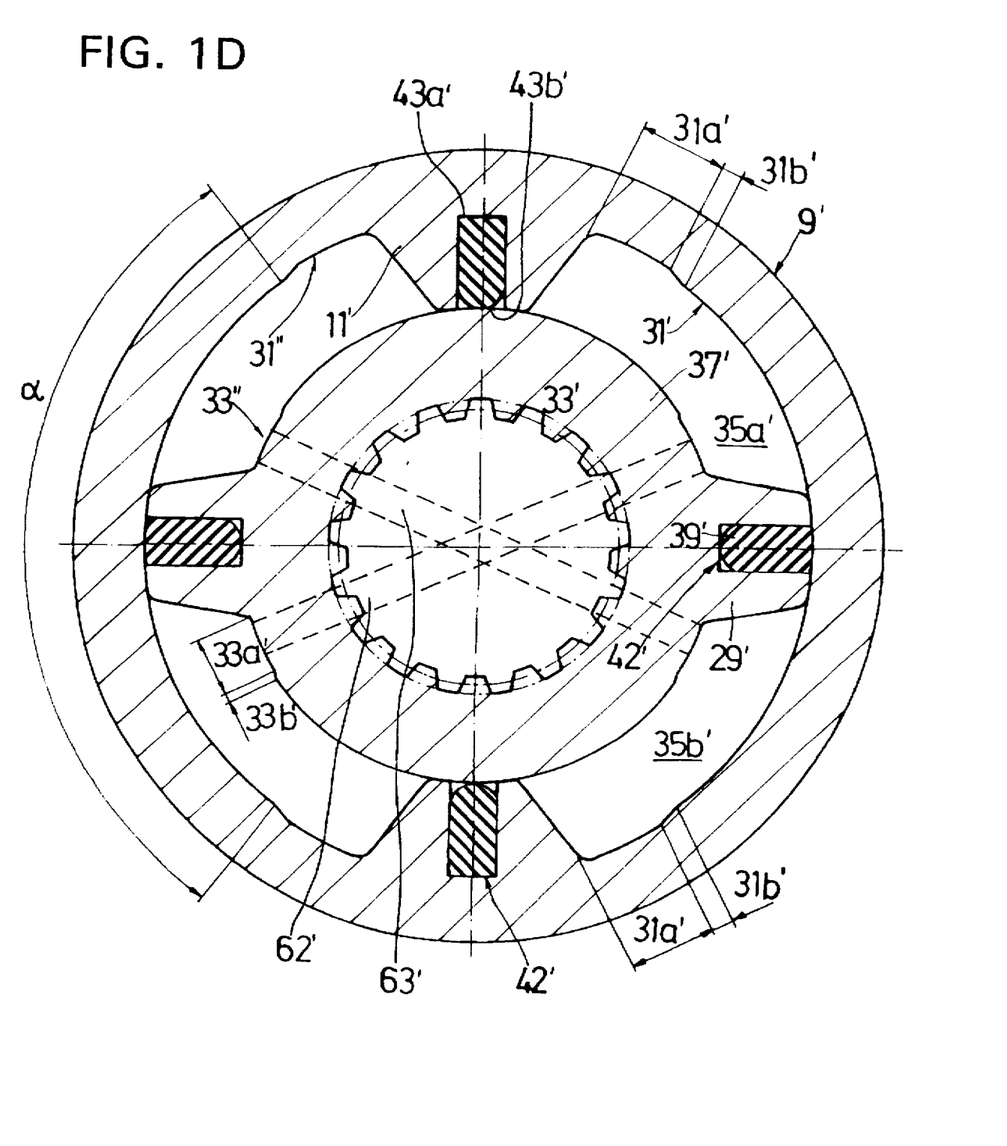
FIGS. 1D and 1E show transverse sectional views of the rotary actuator of FIG. 1C.
Figure 1E:
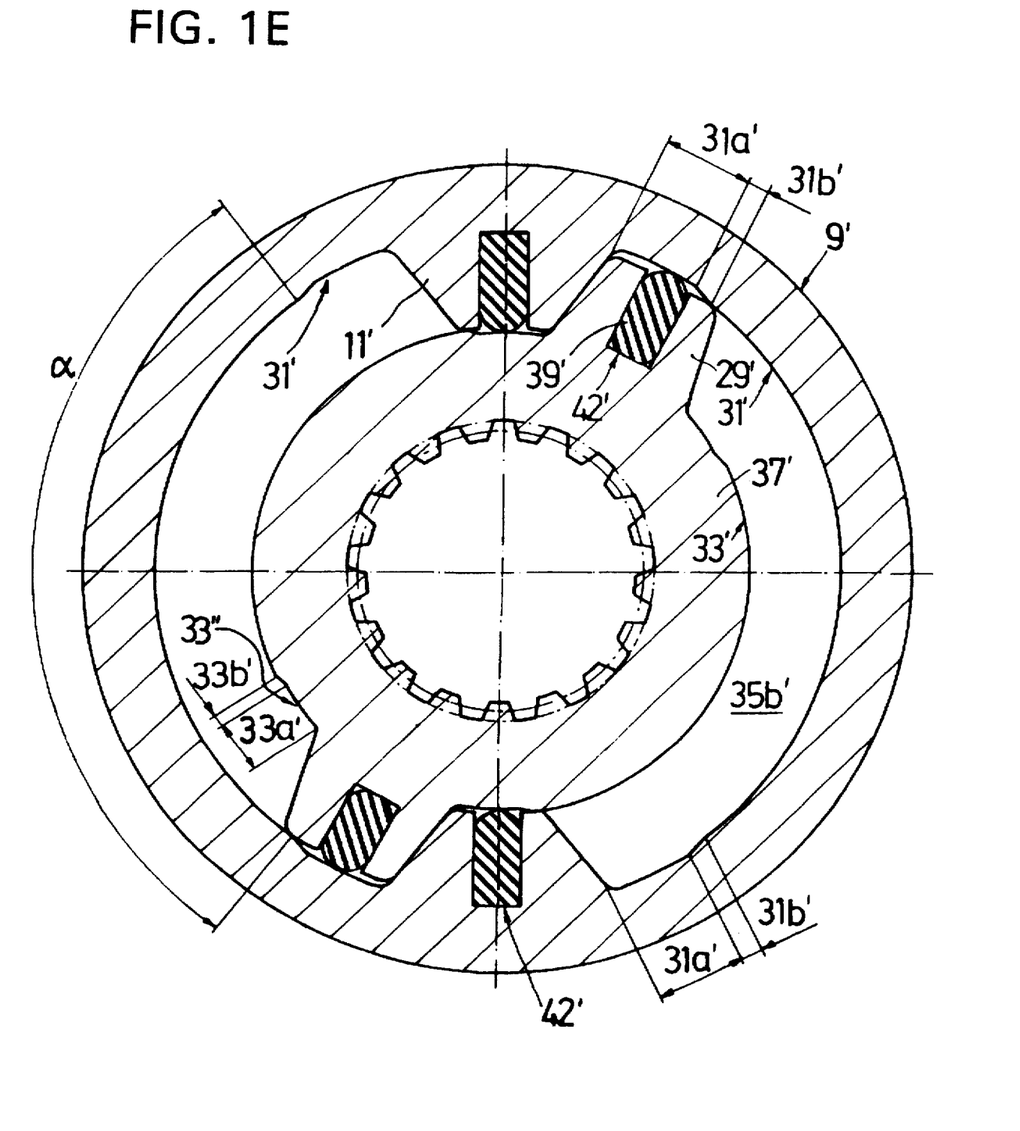

The shaft 7 can preferably have at least one vane 11, shown in FIG. 1B, on at least its outside shell surface 6. As illustrated, this vane 11 could be a separate component 2 which fits into a notch 4 of the outside shell surface 6, or in another embodiment of the present invention as depicted in FIGS. 1C–1E, it might be desirable that the vane 11 be integral with the shaft 7. The motor shaft 7 and the housing 3 with their vanes 11 and ribs 5 can preferably define at least one working chamber 13 therebetween. This working chamber 13 can preferably be closed off on the ends thereof by means of caps 15. A hydraulic medium supply system 17 can preferably be provided through one of the caps 15.

One of the end caps 15, typically the end cap 15 disposed on an opposite side of the rotary actuator, that is, away from the shaft 7, can, like shaft 7, also preferably be configured to be connected to a part of a motor vehicle suspension, as will be discussed further below.

In this embodiment of a rotary actuator as depicted in FIG. 1B, there are preferably four working chambers 13a/13b which can be connected in pairs in a known manner, for example, possibly by a fluid bypass grooves (60' and 61' shown in FIG. 1C) disposed circumferentially within the housing 3, between the housing 3 and the end cap 15, or possibly by connecting passages (62' and 63' shown schematically in FIG. 1D) disposed through the shaft 7, provided that at least a portion of the shaft 7 is substantially solid therethrough. In other words the two chambers labelled 13a can be fluidly connected together, and the two chambers 13b can be fluidly connected together. The working chambers 13a/13b can preferably be hydraulically separated from one another by means of flat gaskets 19. These gaskets 19 can preferably be disposed inside the vanes 11 and the ribs 5. The rotary actuator 1 can also preferably be equipped with gaskets 21 which can preferably seal off the working chambers 13a/13b from the environment. Such gaskets 21 will be further discussed herebelow with reference to FIGS. 2 and 2A.

In order to simplify the placement of the gaskets 19 in the rotary actuator 1, a rotary actuator 1 could preferably be configured in accordance with the embodiments as shown in FIGS. 1C, 1D and 1E, wherein the above-mentioned gaskets 19 are represented by seals 39'. FIG. 1C shows a section of a hydraulic actuator stabilizer system 1' which includes a divided stabilizer, with the stabilizer parts 3' and 5' and a rotary actuator 7'. For reasons of simplicity, the ends of the stabilizers 3' and 5', which ends 3' and 5' can be connected to the respective wheel bearings of a motor vehicle suspension, are not shown in this embodiment, but, as discussed above, will be discussed in more detail herebelow.

The rotary actuator 7' preferably includes, among other things, a cylinder 9' with ribs 11' running axially on its inside diameter. The ribs 11' and the cylinder 9' are preferably realized as an integral unit. An end cap 13' and an end cap 15' on the two ends of the cylinder 9' can preferably define a working area. The positioning of the end caps 13' and 15' within the cylinder 9' can preferably be determined by the end surfaces 17' of the ribs 11'. There can preferably be a weld seam 19' in the terminal regions of the rotary actuator 7' between the end caps 13' or 15' and the cylinder 9'.

A motor shaft 37' can preferably be mounted in the working area by means of friction bearings 25', 27' in such a manner that the shaft 37' can preferably rotate within the cylinder 9'. The motor shaft 37' can preferably have at least one vane 29' on its outside diameter, and the at least one vane 29' can preferably have substantially the same axial orientation as the ribs 11' of the cylinder 9'. The ribs 11' and an inside wall surface 31' of the cylinder 9', as well as the vanes 29' and an outside shell surface 33' of the motor shaft 37', preferably define a working chamber 35', which chamber 35' can be further divided into working chambers 35a' and 35b' (shown in FIG. 1D) by means of the vanes 29' and ribs 11'.

The working chambers 35a', 35b' can preferably be sealed by means of gaskets 21' at the base of the vanes 29' between the end caps 13', 15' and the shaft 37'. The longitudinal edge faces of the vanes 29' and the ribs 11' are preferably sealed by means of seals 39' so that there can be a hydraulic separation between the adjacent working chambers 35a', 35b'. The seals 39' preferably provide the seal by means of their end faces 41a'–41d' and at least one side wall 43a', 43b'. When installed, the operating pressure within the working area preferably increases the static prestress on the seals 39' and preferably thereby provides dynamic sealing.

The cap 15' can preferably be equipped with a first hydraulic connection 45' and a second hydraulic connection 47'. The first and second hydraulic connections 45', 47' can preferably be oriented substantially parallel to the principal axis of the rotary actuator 7, thereby preferably occupying minimal radial space, and thus enabling the connections 45' and 47' to be formed by bores through the cap 15'. Each of the two hydraulic connections 45', 47' can be directly connected to one of the working chambers 35a', 35b'. In addition, an interconnection system, such as shown in FIGS. 1C or 1D, and which are well known in the art and therefore not discussed in any further detail herein, can preferably form a connection between the working chambers 35a' or 35b' with essentially the same indexing, whereby the interconnected working chambers 35a', 35b' of the first hydraulic connection 45' preferably alternate with the working chambers 35b' of the second hydraulic connection 47'.

FIGS. 1D and 1E shows a cross-section through the rotary actuator 7' in the vicinity of the vanes 29' or ribs 11'. Inside the vanes 29' and ribs 11', the seals 39' are preferably enclosed in grooves 42'. In the depicted view of FIG. 1D, the motor shaft 37' is shown in the starting position within the normal rotary angle range (alpha). The rotary angle range (alpha) is preferably determined by the pump capacity relative to the stabilizer. In this rotary angle (alpha) range, the seals 39' can preferably be prestressed by the groove 42' and the inside wall surface 31' or the outside shell surface 33'. Outside of the rotary angle range (alpha), recesses 31", 33" can preferably be worked into the inside wall surface 31' and the outside shell surface 33'. The recesses 31" and 33" can include a base surface 31a', 33a' preferably connected via a transition surface 31b', 33b' to the inside wall surface 31' or the outside shell surface 33'. The geometric configuration of the base surface 31a', 33a' can be varied with relative freedom, as long as the seal 39' inside the recess 31", 33" remains essentially free of prestress. The transition surfaces 31b', 33b' can thereby essentially ensure that the prestress preferably increases continuously to the predetermined level, thereby essentially preventing damage to the seal 39'.

In FIG. 1E, the motor shaft 37' is shown twisted in the installation or removal position within the cylinder 9'. In at least one direction of rotation, the ribs 11' and the vanes 29' preferably come into contact. This position can essentially easily be defined in a manufacturing robot. Each of the seals 39' can preferably be located in the vicinity of a recess 31", 33" and can therefore be under no prestress. The seals 39' can be then be relatively easily installed and removed.

During assembly, the cylinder 9' can preferably be equipped with an end cap 13' (shown in FIG. 1C). This end cap 13' can preferably be disposed about the shaft 37'. Then the motor shaft 37' can preferably be inserted within the cylinder 9', and the vanes 29' of the shaft 37' can be brought into contact with the ribs 11' of the cylinder 9'. The seals 39' can then preferably be installed with the shaft 37' in this position. The rotary actuator 7' can then preferably be closed by means of the second end cap 15'. Finally, the motor shaft 37' can preferably be twisted into its normal rotary angle range (alpha).

Figure 2:
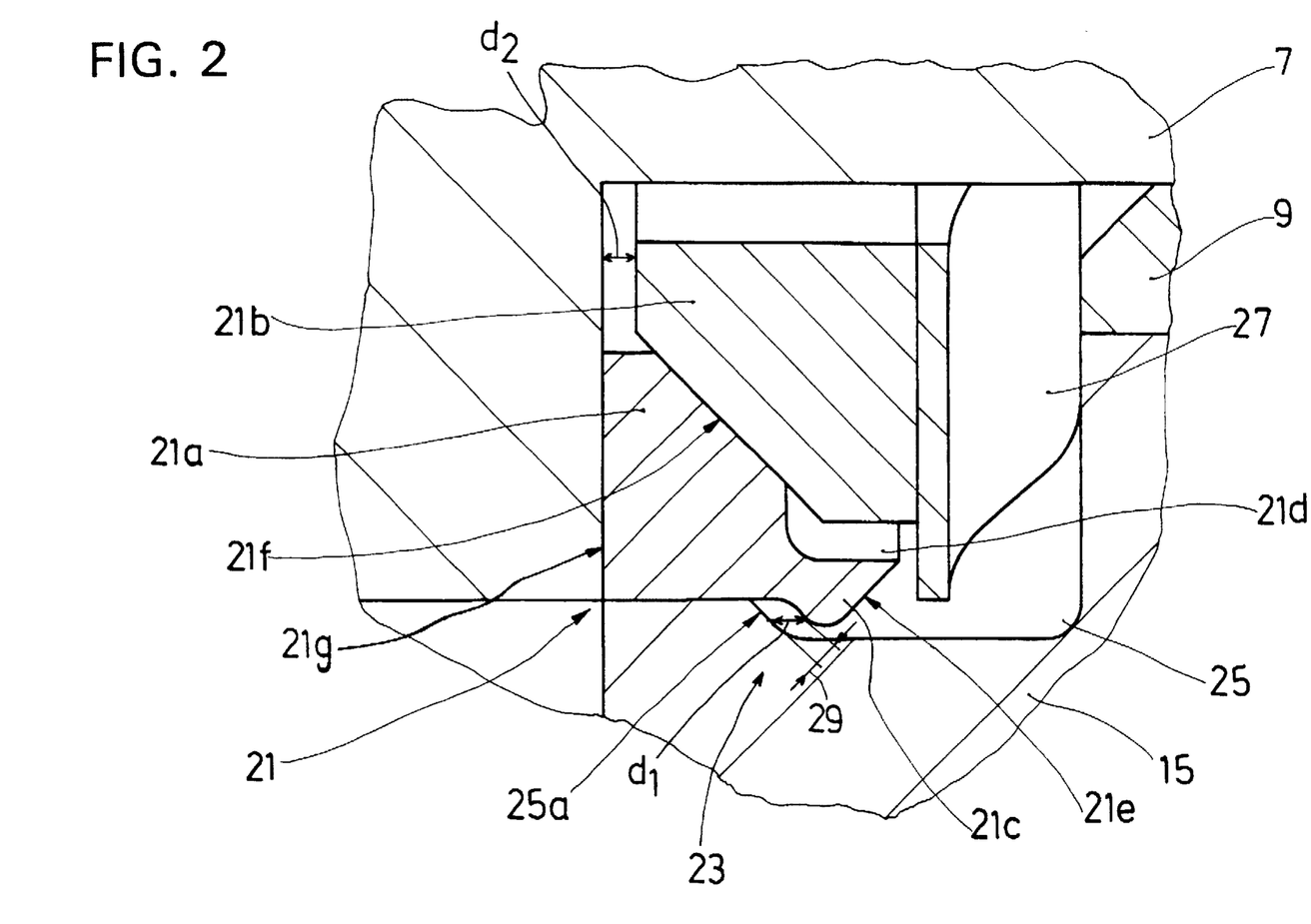
FIG. 2 shows a detailed illustration of a gasket for sealing the interior of a rotary actuator from the environment.
Figure 2A:
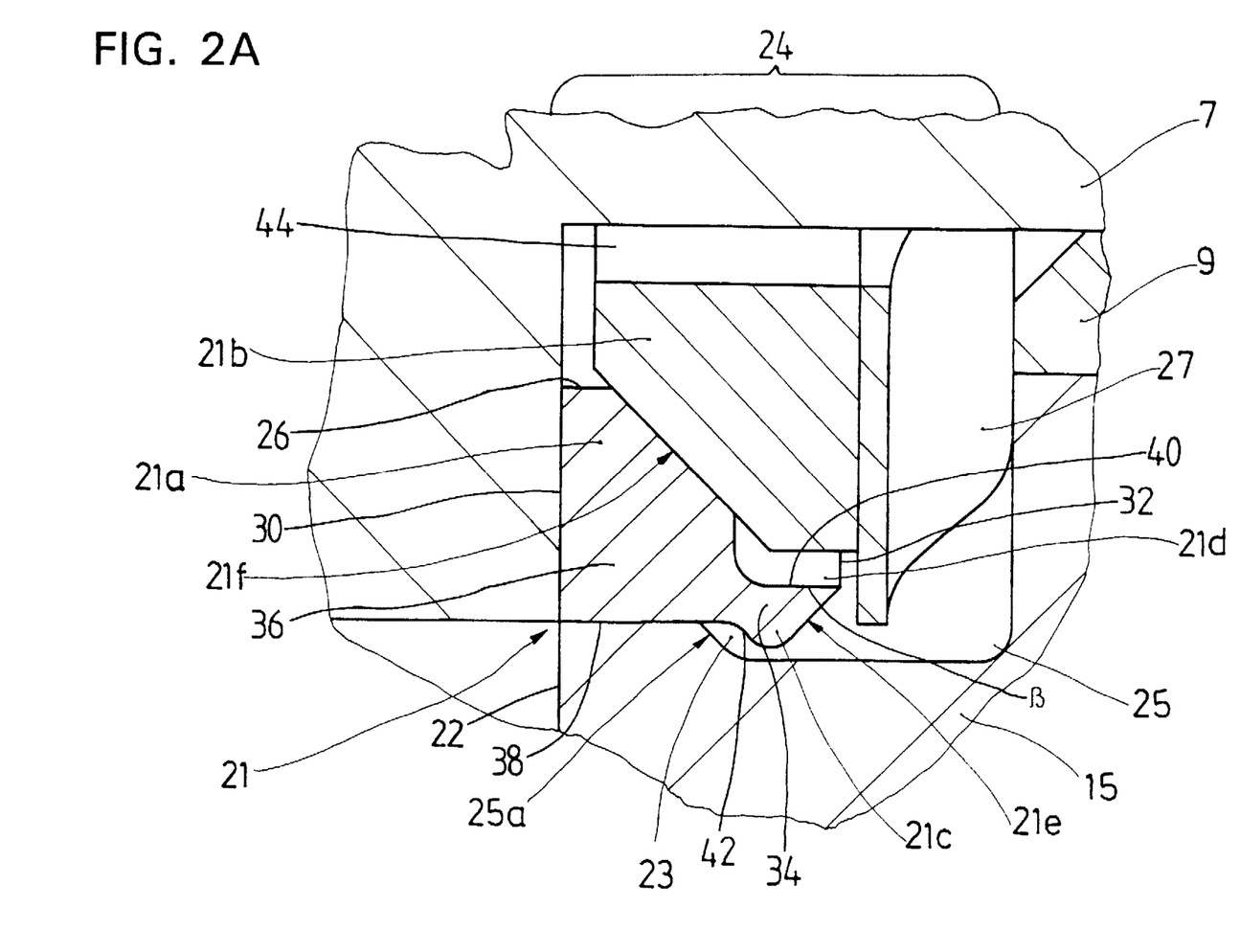
FIG. 2A shows a more detailed depiction of the gasket as shown in FIG. 2.

In both of the embodiments of FIGS. 1A and 1C, a gasket 21 or 21' is preferably provided for sealing the internal working chamber from the environment. FIGS. 2 and 2A essentially depict an enlarged detail of a gasket 21 (which could also be gasket 21') in accordance with at least one embodiment of the present invention.

The gaskets 21 can preferably be installed inside the caps 15, that is, preferably prior to assembly of the caps 15 onto the housing 3 as shown in FIG. 1A. In at least one possible embodiment of the present invention, the caps 15 can preferably be somewhat cylindrical, and can have an axial bore therein for receipt of the shaft 7 therein. As shown in FIG. 2A, on the end 22 of the caps 15, that is, the end which is inserted between the housing 3 and the shaft 7, there can be a groove, or notch 24 cut circumferentially about the inner circumference of the cap 15. This notch 24 can preferably be configured for receiving the gasket 21 therein.

The gaskets 21 and the caps 15 preferably form a latching connection 23 therebetween. FIGS. 2 and 2A show a detailed illustration of the structure of one embodiment of such a latch 23, or catch. To provide the latching connection 23, a gasket groove 25 can preferably be worked into one of the principal components of the motor, in this case the cap 15.

This gasket groove 25 can preferably be formed circumferentially within the notch 24, at a side of the notch 24 away from the end 22. The gasket 21 can then preferably be provided with a projection 21c which preferably engages within the gasket groove 25. In alternative embodiments of the present invention, although not shown, it might be desirable that the groove be formed in the gasket, and the cap 15 be configured with a projection for engaging in the groove of the gasket.

In an alternative embodiment of the present invention the groove 25 would not necessarily have to extend about the entire inner circumferential surface of the cap 15. As such, the groove 25 could be formed by two grooves disposed opposite to one another and extending approximately a quarter of the circumference about the cap 15. Other configurations could also be possible. In this case, the projection portion 21c could then be configured to have sections which correspond to the length of the grooves 25. However, in contrast to the embodiment as described above, an alignment operation would then have to be performed during assembly to ensure that the projection sections aligned with the groove portions.

In a further description of one embodiment of the gasket 21a, the gasket 21a can preferably be somewhat cylindrical in shape and can have an inner bore that defines an inner circumferential surface 26 (see FIG. 1A). This inner circumferential surface 26 can essentially be disposed co-axially with the axis 10 of the rotary actuator 1 (see FIG. 1A). The gasket portion 21a can essentially have a first end 32 for being inserted into the cap 15, and a second end 30 opposite to the first end 32. The first end 32 can preferably be defined by an axial ring 34 which projects away from a main body portion 36 of the gasket 21a at an outer circumferential surface 38 of the gasket 21a. The projection 21c can then preferably have a radius, measured from the axis 10 of the rotary actuator 1, which is greater than a radius of the outer circumferential surface 38 of the gasket 21a.

The assembly of the actuator 1 can preferably be performed by industrial robots. The use of such robots is generally well known in the motor vehicle assembly field. Therefore, a discussion of robots and robotic processes is limited herein to an incorporation by reference of relevant patents showing robots, and associated techniques, for at least providing background information. Such patents which might depict robots useful for assembling rotary actuators are presented further herebelow.

During assembly, a spring 27 can preferably be placed in the gasket groove 25. The first gasket part 21a, which can be braced by the spring 27, can then be inserted. An actual sealing part 21b, which seals the gasket part 21a to the shaft 7 and cap 15, can then be inserted, because the gasket part 21a does not have to be made of a sealing material. After the insertion of the second gasket part 21b, the at least one projection, or snap hook 21c, can be used to create a latching connection between the snap hook 21c and a retaining surface 25a of the gasket groove 25.

In a further embodiment of the present invention, it might be more desirable that, after insertion of the spring 27 into the cap 15, the gasket part 21b be inserted into the cap next. This gasket part 21b can preferably be a hard material to thereby provide a wedge, which in conjunction with the spring 27 can press the gasket part 21a into a sealing arrangement with the shaft 7 and cap 15. The gasket part 21a can then preferably be inserted to engage the snap hook 21c with the gasket groove 25.

The gasket part 21a could preferably be made of a material which is partially compressible to thereby form a pressure-tight seal in the rotary actuator 1. In one embodiment of the present invention, it might be desirable that the gasket part 21a is formed of an elastomeric material. One such type of material which could be used, because of its high abrasion and wear resistance, could preferably be a urethane compound. Other possible types of materials which could be used in further possible embodiments of the present invention include polytetrafluoroethylene (PTFE), nylon, or other similar sealing plastics. The PTFE could also possibly be reinforced with glass fibers.

The gasket part 21b, in at least one embodiment of the present invention, could possibly be made of metal, or alternatively, a substantially hard, or rigid plastic, or rubber, such as synthetic rubber. Thus, essentially all of the force of the spring 27, which could possibly be some sort of conical disc member, could be transmitted through the gasket part 21b and to the gasket part 21a to press the gasket part 21a into its sealing engagement with the shaft 7 and cap 15.

Preferably, during the latching process, the snap hook 21c will essentially undergo an elastic deformation. In other words, the snap hook 21c will be radially inwardly deformed. For this purpose, a notch 21d can preferably be provided in one of the gasket parts 21a and 21b, for providing the necessary space to allow the radially inward deformation of the snap hook 21c. In essence, the notch 21d can be merely a gap formed between the two gasket parts 21a and 21b, and, during the deformation, essentially the entire axial projection 34 can be deflected radially inwardly into the notch 21d.

An end surface 21e of the gasket 21a which gets inserted into the cap 15 can preferably be bevelled. This bevelled end surface 21e can thereby preferably provide a guide surface so that the gasket 21a can be inserted into the cap 15 more easily. For a proper seal, as discussed previously, while a guide bevel could alternatively be provided in the cap 15, a guide bevel on the rotary actuator should be avoided, if possible, to essentially avoid what could be more complicated sealing problems. With such a bevelled surface 21e, a cross-section of the axial projection 34 would therefore be essentially dome shaped, with the inner surface 40 thereof being essentially cylindrical and having the projection 21c extending radially outwardly therefrom.

The surface 21e can essentially extend from an inner surface 40, at the end 32, in a direction both axial and radial, at an angle (beta) which could be about 45 degrees to the inner surface 40. This angle (beta) could alternatively range from about 30 degrees to possibly about 50 degrees. At this angle (beta) the surface 21e thereby forms the bevelled guide surface, increasing in diameter to a maximum diameter to form the projection 21c.

After the latching of the snap hook 21c into the groove 25, the gasket 21 (21a and 21b) can essentially be securely seated inside the rotary actuator, or more specifically the cap 15. Thus, the gasket 21 would essentially be prevented from falling out, or even being moved within the cap 15, during the remainder of the assembly process. In essence, the gasket 21 can be held in a substantially defined position inside the gasket groove 25 by means of the spring 27, so that essentially no pinching of the gasket would occur.

By the insertion of the motor shaft 7 into the end cap 15, the seal parts 21a, 21b are displaced in the direction opposite the force of the spring 7, or in the direction of insertion of the shaft 7. Thus, the sealing part 21a lies, with a front surface 21g, on the motor shaft 7, and, at the same time, the snap hook 21c can preferably be lifted from the retaining surface 25a of the seal groove 25. This lifting of the snap hook 21c from the surface 25a essentially provides a clearance 29 that is preferably larger than the maximum wear travel of the sealing part 25a.

In other words, the clearance 29 can preferably define an axial distance $d_1$ between the retaining surface 25a and the snap hook 21c. This axial distance $d_1$ is preferably greater than an axial wear distance $d_2$ of the gasket part 21a so that, during essentially the entire wear life of the gasket part 21a, the spring 27 can bias and axially move the gasket part 21a towards the shaft 7, and thereby essentially maintain an effective seal adjacent the shaft 7.

The gasket portions 21a and 21b can also preferably be provided with corresponding bevelled surfaces 21f at the juncture between the gasket parts 21a and 21b. These bevelled surfaces 21f can essentially permit the gasket parts 21a and 21b to move axially and radially relative to one another if pressure forces are exerted on them in opposite directions, while still preferably maintaining an effective seal. Such pressure forces could be applied by the hydraulic pressures within the gasket groove 25 and within the working chambers 13a/13b. The relative motion between the gasket parts 21a and 21b can thereby essentially ensure that the gasket 21a rests securely against its two seal surfaces in the axial and radial direction, and that a pressure-dependent prestressing of the gasket 21 can be achieved.

A trailing edge 42 of the projection 21c can also preferably be bevelled, and could be bevelled in the same angular range as the angle (beta), that is, between about 30 degrees to about 50 degrees. This bevelled surface 42 could preferably be provided to facilitate a withdrawal of the gasket 21, under a withdrawal force, from the cap 15. For this purpose, it would probably be desirable to withdraw the entire gasket unit, that is, the first gasket part 21a, the second gasket part 21b and the spring device 27, together as a unit, by inserting a withdrawal tool into a central bore 44 and pulling the gasket unit from the cap 15. The withdrawal force would essentially be sufficient to again deform the axial projection 34 radially inwardly into the gap 21d to allow the gasket portion 21a to be pulled past the gasket groove 25 and out of the cap 15.

In a further possible embodiment of the present invention, although not shown, it might be conceivable that the spring 27 and gasket part 21b be replaced by a single resilient member which has a compressibility to provide a prestress on the gasket part 21a when the cap is attached to the housing 3, and a sufficient rigidity to apply the prestress compression evenly to the gasket part 21a. Such a piece could possibly be formed of a hard rubber material.

Figure 3:
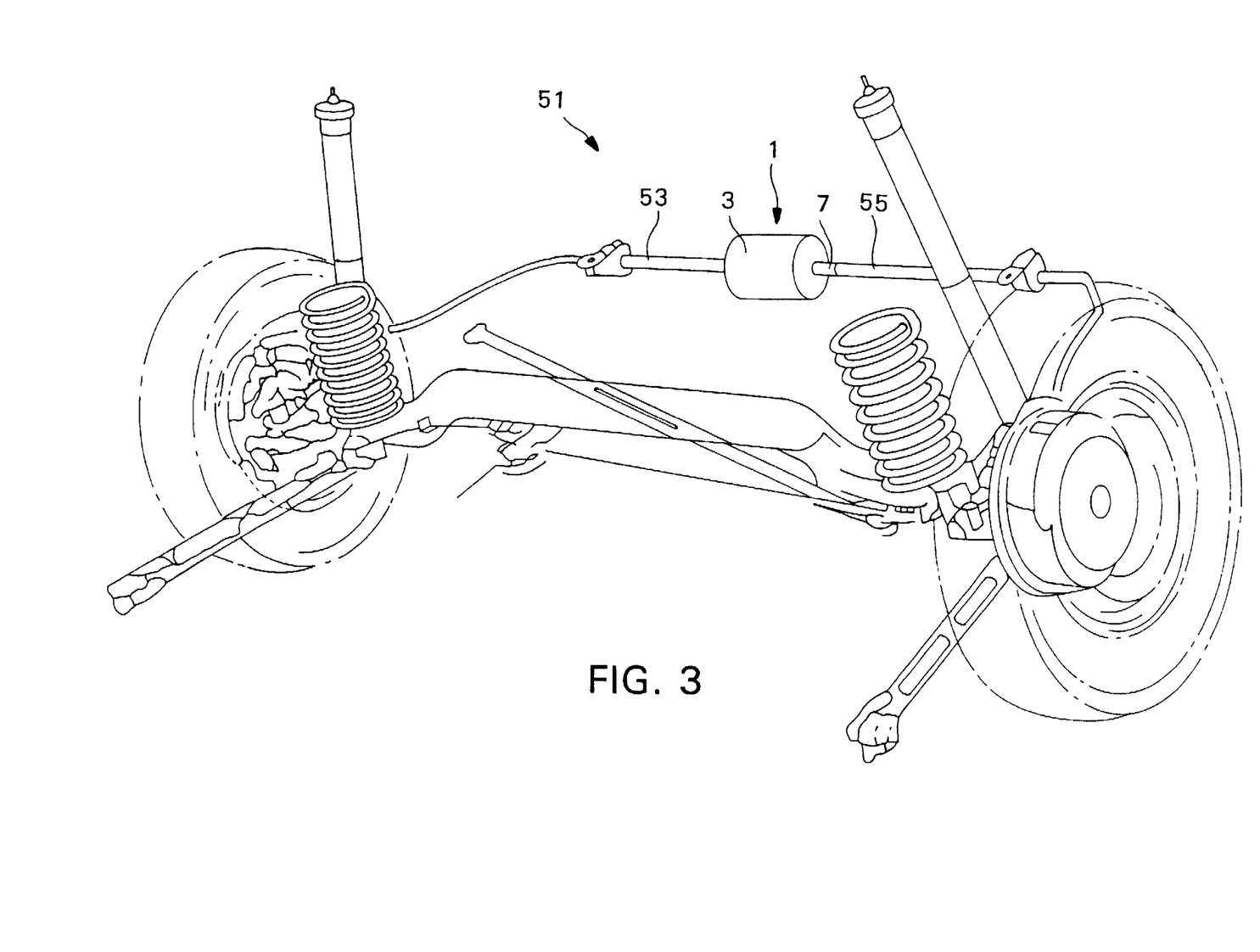
FIG. 3 generally illustrates a rotary actuator in accordance with the present invention in a motor vehicle suspension.

FIG. 3 shows the positioning of a rotary actuator 1 in accordance with the present invention as a part of a stabilizer system 51 of an automobile suspension. The cylinder 1 can preferably be attached via housing 3 to one stabilizer bar 53, and via shaft 7 to another stabilizer bar 55.

Figure 4:
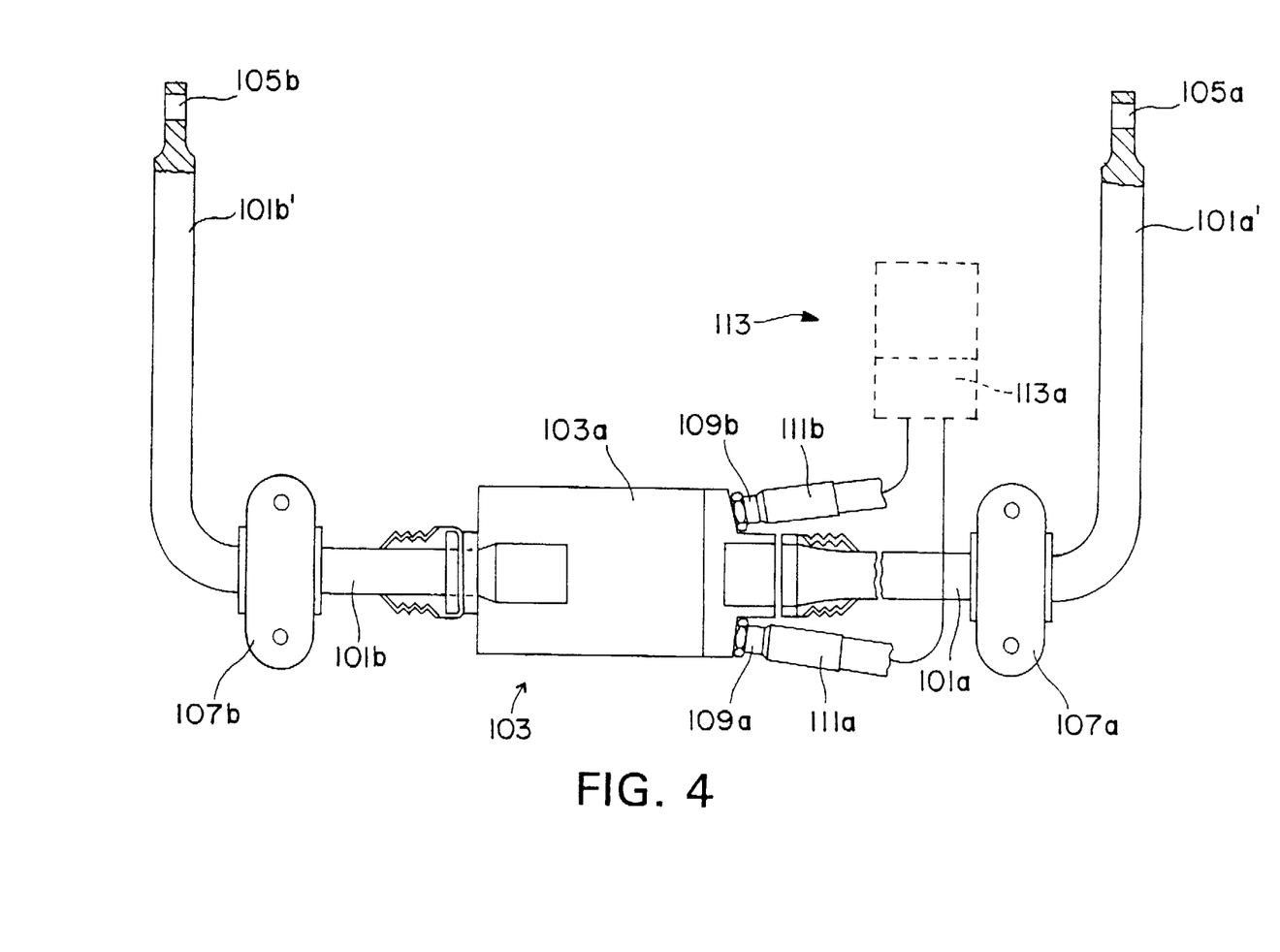
FIG. 4 illustrates in more detail the components of a rotary actuator and the operative connections thereof as provided for a motor vehicle suspension.

A more detailed view of the use of a rotary actuator in a motor vehicle suspension, as shown in FIG. 3, is provided in FIG. 4 which represents a stabilizer 101a, 101b with a rotary actuator 103. On the angled ends 101a', 101b' there are preferably locators 105a, 105b in which the wheel bearings are engaged, which wheel bearings are not shown in the figure for purposes of simplicity. The stabilizer 101a, 101b is preferably fastened to the vehicle by means of articulated clips 107a, 107b.

The rotary actuator 103 essentially includes a rotary actuator housing 103a and a rotary actuator vane assembly, which vane assembly is not shown in the figure, whereby the rotary actuator housing 103a is preferably non-rotationally connected to the stabilizer part 101a, and the rotary actuator vane assembly is preferably non-rotationally connected to the stabilizer part 101b. In the event of uneven deflection of the vehicle springs, the rotary actuator 103 can be rotated by means of the angled ends 101a', 101b', whereby wheel contact forces interact with the angled ends 101a', 101b' to exert a torsional moment on the stabilizer.

The rotary actuator 103 preferably has two hydraulic connections 109a, 109b which preferably form a connection to a hydraulic system 113 via the hydraulic lines 111a, 111b, whereby the hydraulic system preferably includes a hydraulic valve 113a, among other things. The components of the hydraulic system 113 can be permanently installed in the vehicle so that with each deflection of the vehicle springs or stabilizer movement, there can be a relative movement of the hydraulic lines 111a, 111b with respect to the hydraulic system 113, which movement should preferably be compensated for by the hydraulic hoses 111a, 111b together with the hydraulic connections 109a, 109b.

One feature of the invention resides broadly in a hydraulic rotary actuator, having a housing with at least one rib on its inside wall, a motor shaft with at least one vane on its outside shell surface, whereby the housing with its ribs and the motor shaft with its vanes form a working chamber which is closed off on the ends by means of a cap, whereby a gasket, prestressed by a spring, is located between the motor shaft and a component of the housing to seal the working chamber(s) off from the environment, which gasket 21 has a latching mechanism, which forms a latch 23 with the rotary actuator, whereby the latching mechanism is formed by at least one elastic snap hook 21c, which is supported in the direction opposite the mounting direction against a retaining surface 25a of a seal groove 25 of the housing part.

Yet another feature of the invention resides broadly in the hydraulic rotary actuator characterized by the fact that the latching means 21c have a mounting bevel 21e.

Still another feature of the invention resides broadly in the hydraulic rotary actuator characterized by the fact that the gasket 21 is formed by two individual gasket parts 21a, 21b which are supported against one another.

A further feature of the invention resides broadly in the hydraulic rotary actuator characterized by the fact that the two gaskets 21a, 21b have facing bevelled surfaces 21f, which surface allows the gasket parts 21a, 21b to move axially and radially relative to one another if pressure forces are exerted on them in opposite directions.

Another feature of the invention resides broadly in the hydraulic rotary actuator characterized by the fact that one of the two gaskets 21a,21b has at least one notch 21d, which serves as a seat for the elastic snap hook 21c during latching.

Yet another feature of the invention resides broadly in the hydraulic rotary actuator characterized by the fact that the gasket 21 is acted upon by a spring 27, so that the gasket assumes a defined mounting position.

Some types of automobile suspension systems that could be utilized in accordance with the rotary actuator motor may be or are disclosed by the following U.S. Pat. Nos.: 5,178,406 to Reynolds, entitled "Torsion Bar Suspension"; 5,286,059 to Tabe, entitled "Height Control System when Vehicle Is Jacked Up"; 5,288,101 to Minnett, entitled "Variable Rate Torsion Control System for Vehicle Suspension"; and 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Pat. Nos.: 5,332,236 to Kastuhara et al., entitled "Sealing Mechanism for a Rotary Actuator"; 5,309,816 to Weyer, entitled "Rotary Actuator with External Bearings"; 5,267,504 to Weyer, entitled "Rotary Actuator with Annular Fluid Coupling Rotatably Mounted to Shaft"; and 5,310,021 to Hightower, entitled "Motor-driven, Spring-returned Rotary Actuator".

Some types of seals that could be utilized with the present invention may be or are disclosed by the following U.S. Pat. Nos.: 5,321,964 to Lovell et al., entitled "External Seal Device for Tube Hydroforming"; 5,250,607 to Comert et al., entitled "Moisture Cured Elastomeric Interpenetrating Network Sealants"; 5,259,737 to Kamisuki et al., entitled "Micropump with Valve Structure"; 5,234,194 to Smith, entitled "Seal for a Shaft"; and 5,190,299 to Johnston, entitled "Radially Undulating Shaft Seal".

Some type of industrial robots and assembly processes using such robots which could possibly be utilized for assembling rotary actuators might be or are disclosed by the following U.S. Pat. Nos.: 5,197,846 to Uno et al., entitled "Six-Degree-of-Freedom Articulated Robot Mechanism and Assembling and Working Apparatus Using Same"; 5,203,073 to Kotake et al., entitled "Apparatus for Assembling Exterior Parts of a Motorcar"; 5,267,385 to Ikeda et al., entitled "Automatic Assembly Apparatus"; 5,295,778 to Hirai et al., entitled "Assembling Apparatus"; and 5,319,845 to Watanabe, et al., entitled "Assembling Apparatus Using Robot".

The appended drawings in their entirety, including all dimensions, proportions and/or shapes in at least one embodiment of the invention, are accurate and are hereby included by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A rotary actuator comprising:

housing means;

means for connecting said housing means to a first portion of a motor vehicle suspension;

shaft means, said shaft means having a longitudinal axis;

at least a portion of said shaft means being rotatably disposed within said housing means;

means for connecting said shaft means to a second portion of a motor vehicle suspension;

bearing means for rotatably mounting said at least a portion of said shaft means within said housing means for rotation of at least one of said shaft means and said housing means about said longitudinal axis with respect to the other of said shaft means and said housing means;

said shaft means comprising an outer surface disposed towards said housing means;

said housing means comprising an inner surface disposed towards said outer surface;

a chamber disposed between said outer surface of said shaft means and said inner surface of said housing means, said chamber having a first axial end and a second axial end;

said outer surface of said shaft means comprising at least one vane means extending towards said housing means;

said inner surface of said housing means comprising at least one rib means extending towards said shaft means;

said at least one vane means and said at least one rib means being disposed to divide said chamber into a first chamber portion and a second chamber portion;

said housing means comprising means for closing at least one of said first and second axial ends of said chamber;

gasket means for sealing said housing means about said shaft means; and catch means for retaining said gasket means within said housing means during at least a portion of assembly of said actuator;

said catch means comprises means for permitting axial movement of said gasket means in the direction of the longitudinal axis;

said catch means comprises a projection;

said catch means comprises a recess for retaining said projection;

said recess comprises a retaining surface for contacting said projection to retain said gasket means;

said recess and projection are dimensioned to permit axial separation between said projection and said retaining surface by an axial distance to permit axial movement of said gasket means; and the axial distance is dimensioned to be greater than an axial dimension of wear of said gasket means.

2. The rotary actuator according to claim 1, wherein:

said projection comprises means for guiding said projection into said recess;

said guiding means comprises a beveled surface disposed on said projection;

said gasket means comprises a first gasket part and a second gasket part supported against one another;

said gasket means comprises means for biasing and moving said first gasket part axially and radially;

said first gasket biasing and moving means comprises facing beveled surfaces in contact between said first gasket part and said second gasket part;

said projection is a snap hook;

one of said first and said second gasket parts comprises a notch for seating said snap hook during at least a portion of assembly; and a spring for biasing said gasket means axially.

3. A rotary actuator comprising:

housing means;

means for connecting said housing means to a first portion of a motor vehicle suspension;

shaft means, said shaft means having a longitudinal axis;

at least a portion of said shaft means being rotatably disposed within said housing means;

means for connecting said shaft means to a second portion of a motor vehicle suspension;

bearing means for rotatably mounting said at least a portion of said shaft means within said housing means for rotation of at least one of said shaft means and said housing means about said longitudinal axis with respect to the other of said shaft means and said housing means;

said shaft means comprising an outer surface disposed towards said housing means;

said housing means comprising an inner surface disposed towards said outer surface;

a chamber disposed between said outer surface of said shaft means and said inner surface of said housing means, said chamber having a first axial end and a second axial end;

said outer surface of said shaft means comprising at least one vane means extending towards said housing means;

said inner surface of said housing means comprising at least one rib means extending towards said shaft means;

said at least one vane means and said at least one rib means being disposed to divide said chamber into a first chamber portion and a second chamber portion;

said housing means comprising means for closing at least one of said first and second axial ends of said chamber;

gasket means for sealing said housing means about said shaft means; and catch means for retaining said gasket means within said housing means during at least a portion of assembly of said actuator.

4. The rotary actuator according to claim 3, wherein:

said catch means comprises means for permitting axial movement of said gasket means in the direction of the longitudinal axis.

5. The rotary actuator according to claim 4, wherein:

said catch means comprises a projection; and said catch means comprises a recess for retaining said projection.

6. The rotary actuator according to claim 5, wherein:

said recess comprises a retaining surface for contacting said projection to retain said gasket means;

said recess and projection are dimensioned to permit axial separation between said projection and said retaining surface by an axial distance to permit axial movement of said gasket means; and the axial distance is dimensioned to be greater than an axial dimension of wear of said gasket means.

7. The rotary actuator according to claim 6, wherein:

said means for closing comprises cap means;

said cap means comprises a groove disposed circumferentially around said shaft means; and said gasket means is disposed in said groove.

8. The rotary actuator according to claim 7, wherein:

said gasket means comprises said projection; and said groove comprises said recess.

9. The rotary actuator according to claim 8, wherein:

said shaft means comprises a surface disposed axially adjacent said gasket means; and said cap means comprises means for biasing said gasket means in an axial direction towards said axial surface of said shaft means.

10. The rotary actuator according to claim 9, wherein:

said gasket means comprises a first gasket part and a second gasket part;

said first gasket part is disposed to contact said axial surface of said shaft means to seal between said shaft and said cap means;

said second gasket part is disposed adjacent to said bias means to transfer a force from said bias means to said first gasket part; and said gasket means comprises means for biasing and moving said first gasket part axially and radially.

11. The rotary actuator according to claim 10, wherein:

said first gasket biasing and moving means comprises facing beveled surfaces in contact between said first gasket part and said second gasket part.

12. The rotary actuator according to claim 11, wherein:

said projection is an elastic snap hook;

said recess extends continuously and circumferentially around said cap means;

said projection extends continuously and circumferentially around said gasket means;

said projection comprises means for guiding insertion of said gasket means into said cap means;

said gasket guiding means comprises a beveled surface disposed on said projection;

said projection is elastically deformable to permit insertion of said gasket means into said cap means;

said first gasket part is axially offset from said second gasket part;

said first gasket part comprises a cylindrical extension surrounding said second gasket part;

said second gasket part comprises a conical ring having a base portion for engaging said biasing means and a central bore therein for being disposed about said shaft means;

said biasing means comprises a spring;

said facing beveled surfaces in contact between said first gasket part and said second gasket part are disposed at an angle of about 45 degrees to the longitudinal axis;

said cap means comprises said bearing means for rotatably mounting said shaft means;

said cap means comprises at least one cap separate from said housing means, said cap being welded to said housing means to affix said cap to said housing means;

said at least one cap comprises first and second caps, with one of said caps disposed at each of said first and second axial ends of said chamber;

said shaft means comprises at least two vanes; and said housing means comprises at least two ribs.

* * * * *

UNITED STATES PATENT AND TRADEMARK OFFICE
CERTIFICATE OF CORRECTION

PATENT NO. : 5,791,444
DATED : August 11, 1998
INVENTOR(S) : Stefan SCHIFFLER

It is certified that error appears in the above-identified patent and that said Letters Patent is hereby corrected as shown below:

In column 4, line 10, after 'vehicle', delete "suspensions" and insert --suspension;--.

Signed and Sealed this

Ninth Day of February, 1999

Attest:

*Attesting Officer*

*Acting Commissioner of Patents and Trademarks*